United States Patent
Zimmermann

(10) Patent No.: US 10,766,216 B2
(45) Date of Patent: Sep. 8, 2020

(54) TIRE HEATING PRESS

(71) Applicant: HARBURG-FREUDENBERGER MASCHINENBAU GMBH, Hamburg (DE)

(72) Inventor: Arne Zimmermann, Deinste (DE)

(73) Assignee: HARBURG-FREUDENBERGER MASCHINENBAU GMBH, Hamburg (DE)

(*) Notice: Subject to any disclaimer, the term of this patent is extended or adjusted under 35 U.S.C. 154(b) by 0 days.

(21) Appl. No.: 16/066,582

(22) PCT Filed: Jan. 27, 2017

(86) PCT No.: PCT/DE2017/000015
§ 371 (c)(1),
(2) Date: Jun. 27, 2018

(87) PCT Pub. No.: WO2017/148459
PCT Pub. Date: Sep. 8, 2017

(65) Prior Publication Data
US 2019/0009487 A1    Jan. 10, 2019

(30) Foreign Application Priority Data
Feb. 29, 2016 (DE) .......... 10 2016 002 532

(51) Int. Cl.
*B29D 30/06* (2006.01)
*B29C 35/00* (2006.01)

(52) U.S. Cl.
CPC ........ *B29D 30/0662* (2013.01); *B29C 35/007* (2013.01); *B29D 2030/0667* (2013.01)

(58) Field of Classification Search
CPC ........ B29D 30/0662; B29D 2030/0666; B29D 2030/0667; B29C 35/007; F16K 31/12; F16K 31/122
See application file for complete search history.

(56) References Cited

U.S. PATENT DOCUMENTS

| | | | |
|---|---|---|---|
| 2,204,513 A * | 6/1940 | Sandberg | B29C 35/0294 137/624.18 |
| 3,870,443 A | 3/1975 | Schatz | |
| 4,370,283 A | 1/1983 | Arimatsu | |
| 4,586,531 A * | 5/1986 | Lindell | B29C 35/007 137/334 |
| 7,156,629 B2 * | 1/2007 | Ichimaru | B29D 30/0601 425/42 |
| 7,490,625 B1 * | 2/2009 | Johnson | G01M 3/3236 137/596.16 |
| 9,308,700 B2 * | 4/2016 | Mizuta | B29D 30/0601 |

(Continued)

FOREIGN PATENT DOCUMENTS

| | | |
|---|---|---|
| CN | 201012528 Y | 1/2008 |
| EP | 0143089 A2 | 5/1985 |

(Continued)

*Primary Examiner* — James P Mackey
(74) *Attorney, Agent, or Firm* — Lucas & Mercanti, LLP; Klaus P. Stoffel

(57) ABSTRACT

A device is used to vulcanize tire blanks and has at least one heatable mold for receiving the tire blank. Furthermore, the device has at least one controllable supply device for a heating medium, which is provided with at least one valve. The valve has a positioning device that is actuated by a liquid fluid.

4 Claims, 2 Drawing Sheets

(56) References Cited

U.S. PATENT DOCUMENTS

| | | | | |
|---|---|---|---|---|
| 2004/0046135 A1* | 3/2004 | Wieder | ................ | F16K 31/122 |
| | | | | 251/63.6 |
| 2006/0012076 A1* | 1/2006 | Caretta | ................ | B29C 35/007 |
| | | | | 264/326 |
| 2010/0007038 A1 | 1/2010 | Mitamura | | |
| 2010/0278950 A1* | 11/2010 | Ichimaru | ............ | B29D 30/0662 |
| | | | | 425/38 |

FOREIGN PATENT DOCUMENTS

| | | |
|---|---|---|
| EP | 2308662 A1 | 4/2011 |
| EP | 2567808 A1 | 3/2013 |
| JP | S63221018 A | 9/1988 |
| WO | 2015165430 A1 | 11/2015 |

* cited by examiner

TIRE HEATING PRESS

CROSS-REFERENCE TO RELATED APPLICATIONS

The present application is a 371 of International application PCT/DE2017/000015, flied Jan. 27, 2017, which claims priority of DE 10 2016 002 532,8, filed Feb. 29, 2016, the priority of these applications is hereby claimed and these applications are incorporated herein by reference.

BACKGROUND OF THE INVENTION

The invention relates to a device for the vulcanization of tire blanks, which has at least one heatable mold for receiving the tire blank and which has at least one controllable supply device for a heating medium, which is provided with at least one valve.

In the production of tires, a plurality of production steps is performed. In a first production step, extruded strips of an elastomeric material are usually joined together on a tire building drum to form a tire blank. This is often carried out using wire-type reinforcing inserts made of steel to enable "steel-belted tires" to be produced.

The tire blank is then transferred to a heating press and, in said press, is inserted into a heatable mold and typically subjected to an internal pressure. In general, it is possible both for the mold which receives the tire blank to be heatable and for there to be the possibility of introducing a heating medium into the tire blank in order to subject it during vulcanization to an internal pressure, which contributes to stabilization of the predetermined tire contour.

Various substances can be used as heating media. Steam, hot water or hot nitrogen are widely used. The heating medium is typically fed to the vulcanization process via pneumatically activated valves. In general, "monostable" valves are used. In particular, use is made of valves which are closed in a normal state or which are open in a normal state. Valves which are closed in a normal state are often used in the area where heating medium is supplied. Here, the control medium forces the valves to transfer to an open state against a spring force. In the event of an emergency shutdown and/or a failure of the control pressure, the valves are transferred to a closed state by the spring force. Valves which are open in a normal state are typically used in the outlet area. Here, the springs thus force the valves into the open position in the event of a pressure failure. This ensures that the pressurized space is vented to the environment and, as a result, is depressurized and thus safe.

The use of electrically controlled valves is likewise already known. However, these valves are often slow in respect of the switching times that can be achieved. Moreover, these valves are often not capable of achieving a predetermined normal state in an open or closed position.

Likewise disadvantageous is the fact that, where the valves have a relatively large nominal diameter, there is a risk of a reduction in the pressure of the heating medium. Finally, the actuating forces required are often also relatively large.

In a typical tire production process, a large number of tire heating presses is often operated in fabrication shops. In the case of pneumatically controlled valves, very complex pipe routing is required to supply the pressurized gases. In pneumatic devices of this kind, leaks and other problems with leaktightness often lead to total losses of up to about 80 percent of the compressed air used. Thus significantly more compressed air must be provided than is required for the actual control processes. As a result, relatively large and thus relatively expensive compressors are required, or the number of compressors must be increased at corresponding cost. Here, the costs relate not only to the equipment costs per se but likewise to operating costs.

SUMMARY OF THE INVENTION

It is the object of the present invention to make the control of the supply of heating medium more effective while retaining technical quality.

According to the invention, this object is achieved by virtue of the fact that the valve has a positioning device that is actuated by a liquid fluid.

Supply devices for liquid fluids can be sealed off from an environment significantly more effectively than supply and distribution devices for gaseous fluids. Significantly lower leakage losses therefore generally occur in corresponding line systems for liquid fluids than in corresponding installations for gaseous fluids.

Precise predetermination of the valve position can be achieved if the positioning device has a piston-cylinder assembly.

To provide the required volume flows and required pressures, it is proposed that a pump is used to deliver the liquid fluid and for a pressure buildup.

A sufficient reservoir of liquid fluid can be provided if the pump is coupled to a tank.

Simple and, at the same time, extremely reliable control can be achieved if at least one of the valves is coupled to a control valve.

To increase plant safety, it is proposed that at least one of the valves is of monostable design.

A normal state of the valve can be predetermined if at least one of the valves has a spring for the definition of a normal position.

According to one embodiment, it is envisaged that the inlet valve is closed in a normal state.

It is likewise possible for the outlet valve to be open in a normal state.

According to another embodiment, it is also envisaged that the heating press 1 has at least one pressure control valve controlled by a liquid fluid.

BRIEF DESCRIPTION OF THE DRAWING

Illustrative embodiments of the invention are shown schematically in the drawings, in which.

DETAILED DESCRIPTION OF THE INVENTION

Figure 1:
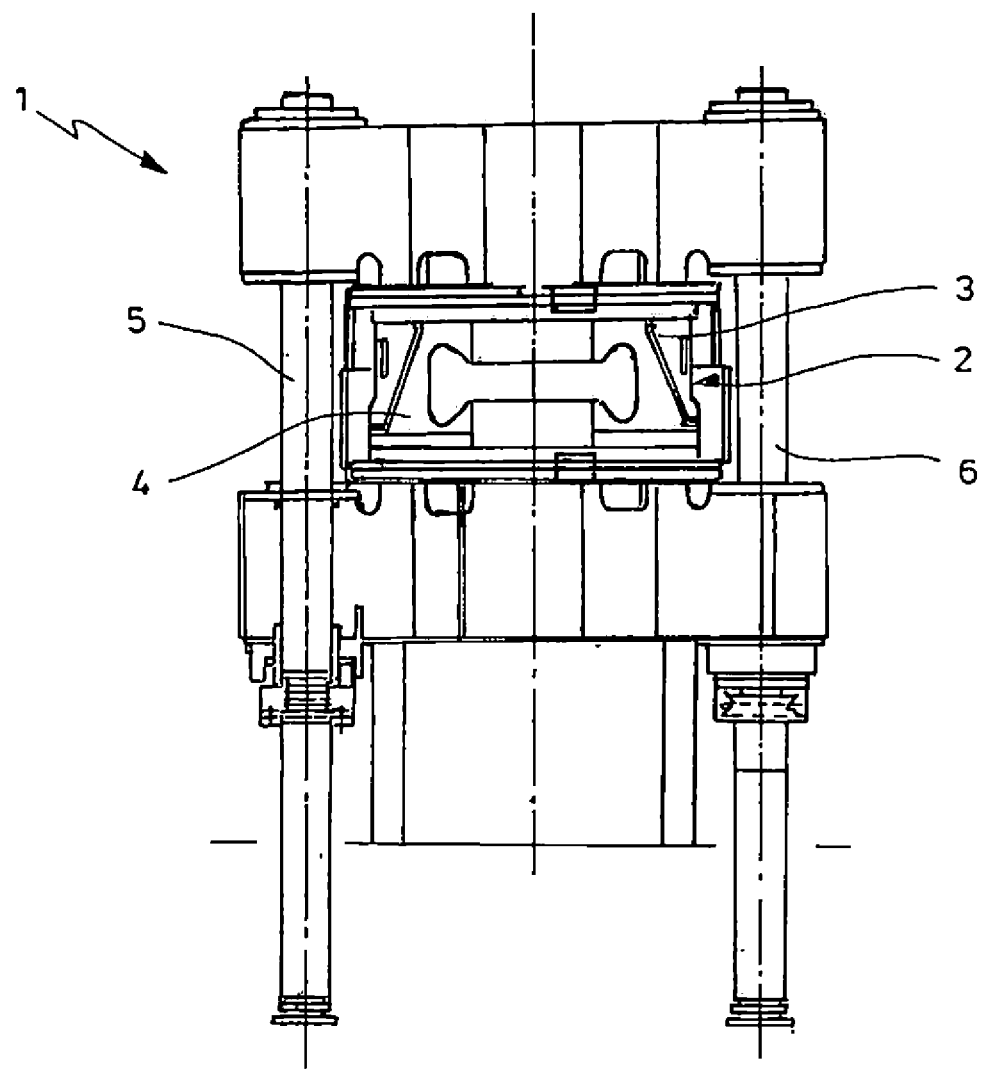
FIG. 1 shows a simplified illustration of a heating press using a column-type heating press as an example.

FIG. 1 shows the structural design of a heating press (1). The heating press (1) is used to vulcanize the material of a green tire (not shown). To receive the green tire, the heating press (1) has a mold (2) which comprises an upper mold half (3) and a lower mold half (4). In the illustrative embodiment shown, the lower mold half (4) is arranged so as to be immovable. The upper mold half (3) can be positioned in a vertical direction. The mold (2) can be opened and closed by appropriate positioning of the upper mold half (3).

The heating press (1) shown in FIG. 1 is designed as a column-type heating press and has columns (5, 6). Pistons (7, 8), which can be positioned relative to cylinders (9, 10), are used to position the upper mold half (3).

According to another embodiment, the heating press (1) can also be embodied as a frame heating press.

Figure 2:
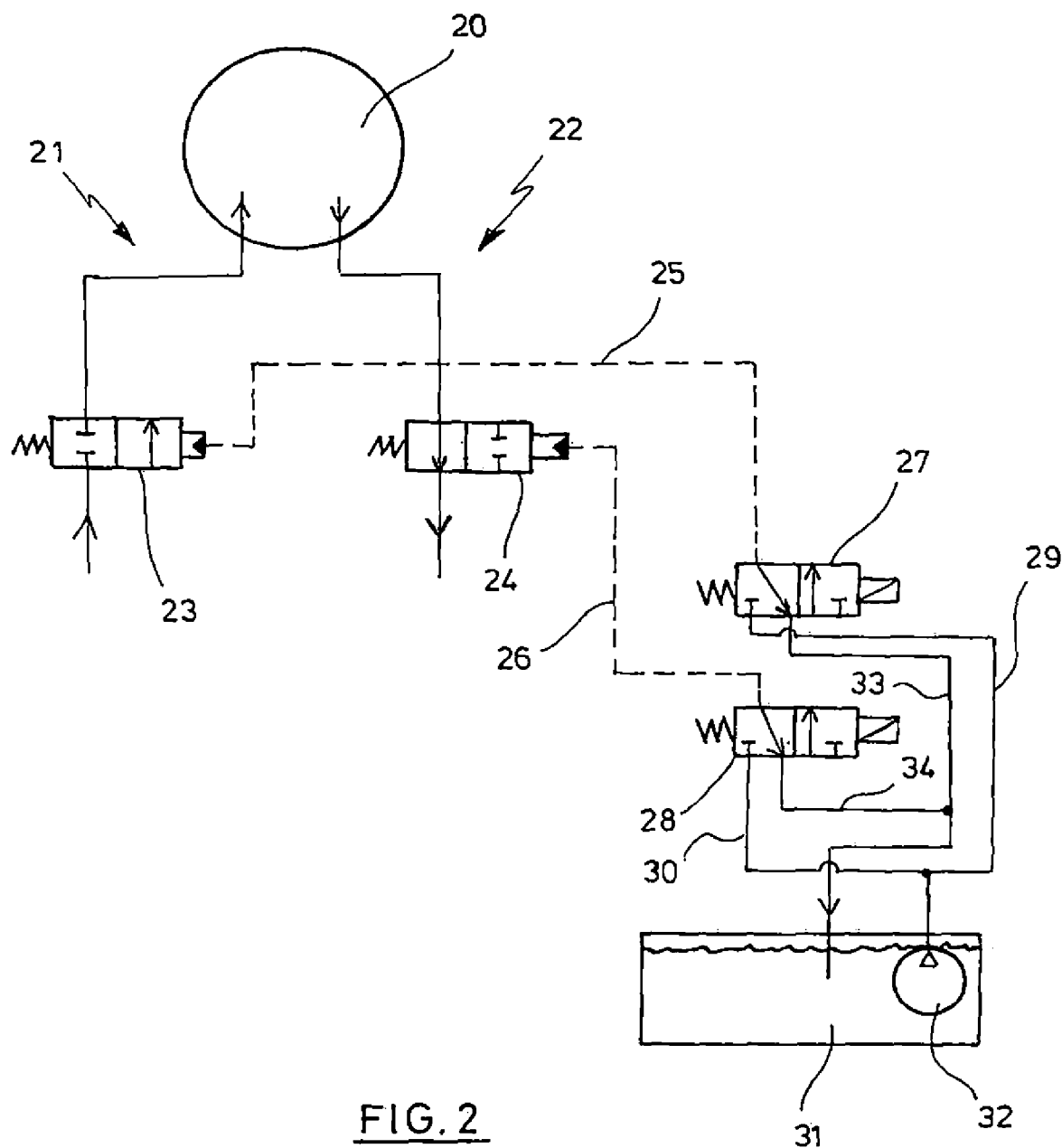
FIG. 2 shows a circuit diagram intended to illustrate valve control when using a liquid fluid.

FIG. 2 shows a block circuit diagram intended to illustrate the supply of a heating medium into the area of the mold (2) in order to carry out vulcanization of the green tire there.

An inlet area (21) and an outlet area (22) are used to carry out the schematically illustrated vulcanization process (20). In these areas, the required heating medium is supplied or discharged.

The inlet area (21) is provided with an inlet valve (23), and the outlet area (22) is provided with an outlet valve (24). The valves (23, 24) are typically designed as monostable valves.

In a normal state, when not supplied with a control medium, the inlet valve (23) is closed. The outlet valve (23) is open when not supplied with a control pressure. The respective normal position of the valves (23, 24) is typically achieved by using a spring, against the force of which an applied control pressure operates. Springs of this kind are typically embodied as compression springs.

The inlet valve (23) has a control line (25), and the outlet valve (24) is provided with a control line (26).

A control valve (27) is connected to the control line (25). The control line (26) is provided with a control valve (28).

According to a typical embodiment, the control valves (27, 28) are designed as 3/2-way valves. It is likewise envisaged, in particular, that the control valves (27, 28) are embodied as electrically actuated valves.

The control valves (27, 28) are connected to a tank (31) by supply lines (29, 39). A liquid fluid stored in the tank (31) is typically delivered into the supply lines (29, 39) by a pump (32).

Liquid fluid is fed back into the tank (31) via return lines (33, 34).

The invention claimed is:

1. A device for vulcanization of tire blanks, comprising: at least one heatable mold for receiving the tire blank; at least one controllable supply device for a heating medium, the supply device having one inlet valve and one outlet valve, wherein the inlet valve has a first positioning device that is actuated by a liquid fluid, wherein the outlet valve has a second positioning device that is actuated by the liquid fluid, wherein the first positioning device includes a first piston-cylinder assembly and the second positioning device includes a second piston-cylinder assembly; and a pump to deliver the liquid fluid from a tank to the first and the second piston-cylinder assemblies and for a pressure buildup, wherein the pump is coupled to the tank, and wherein the inlet valve is connected to a first control valve by a first control line for actuating the inlet valve and the outlet valve is connected to a second control valve by a second control line for actuating the outlet valve, wherein the first control valve and the second control valve are 3/2-way valves.

2. The device according to claim 1, wherein the inlet valve has a spring for definition of a normal position.

3. The device according to claim 1, wherein the inlet valve is closed in a normal state.

4. The device according to claim 1, wherein the outlet valve is open in a normal state.

* * * * *